Figure 1:
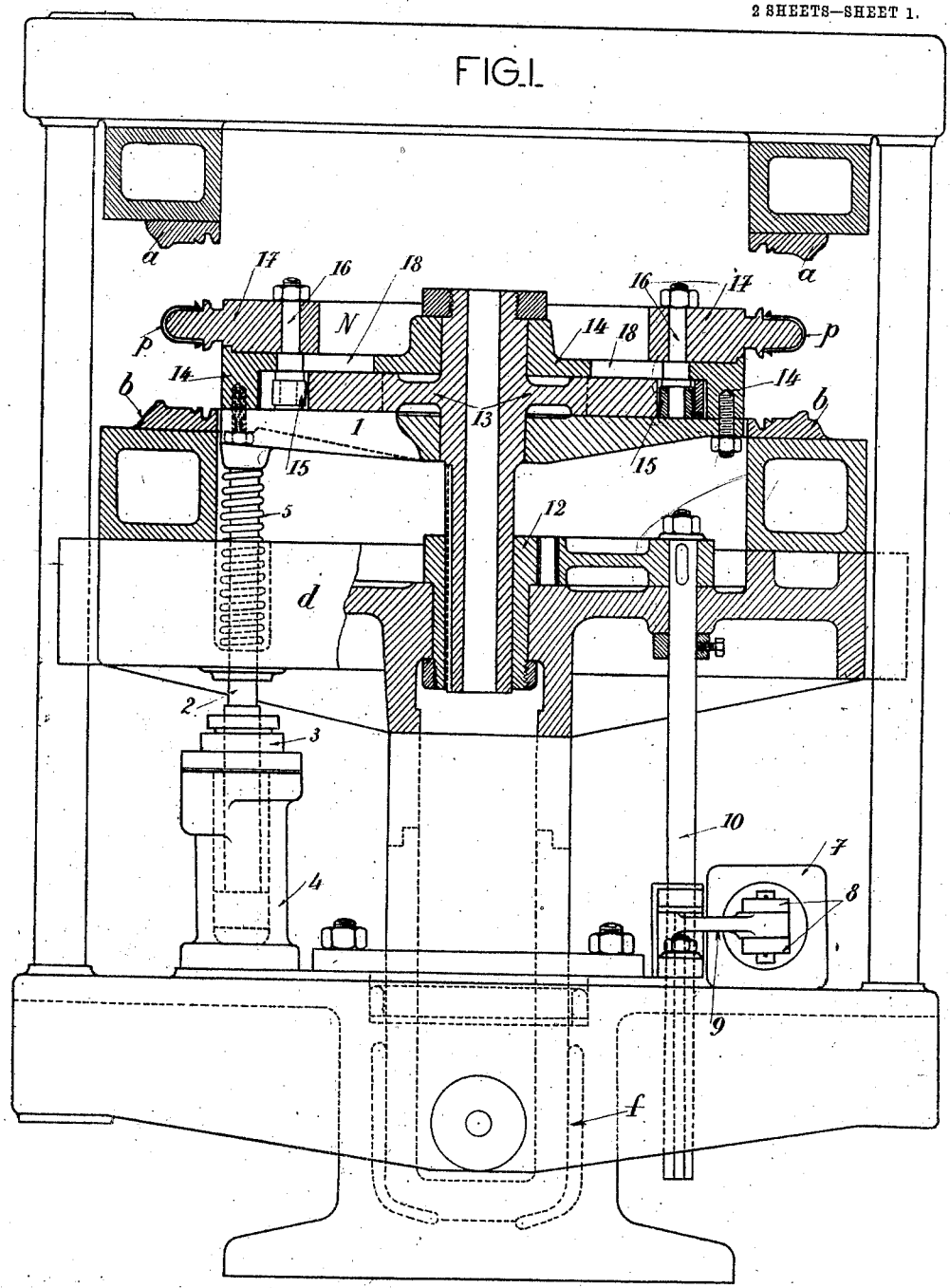

No. 868,732.  
PATENTED OCT. 22, 1907.
A. E. VINCENT.
PRESS FOR VULCANIZING PNEUMATIC TIRES.
APPLICATION FILED JUNE 12, 1907.
2 SHEETS—SHEET 2.
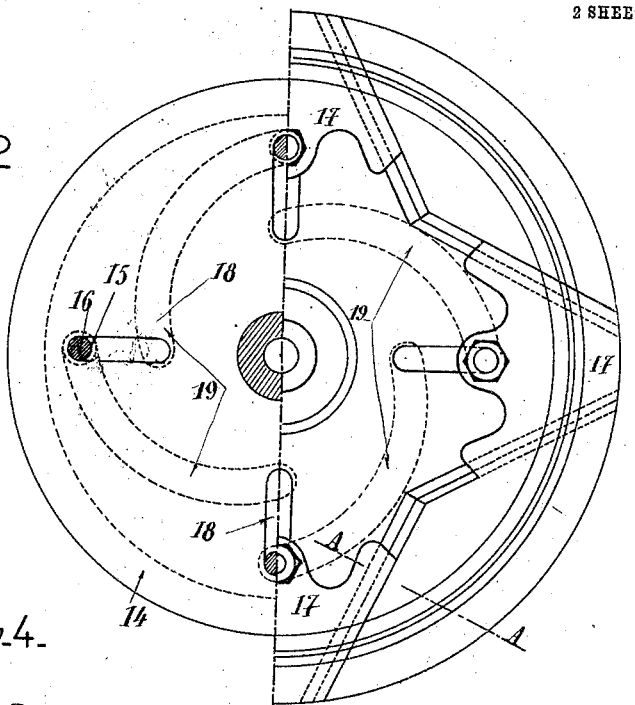
FIG.2
FIG.4.
FIG.3.
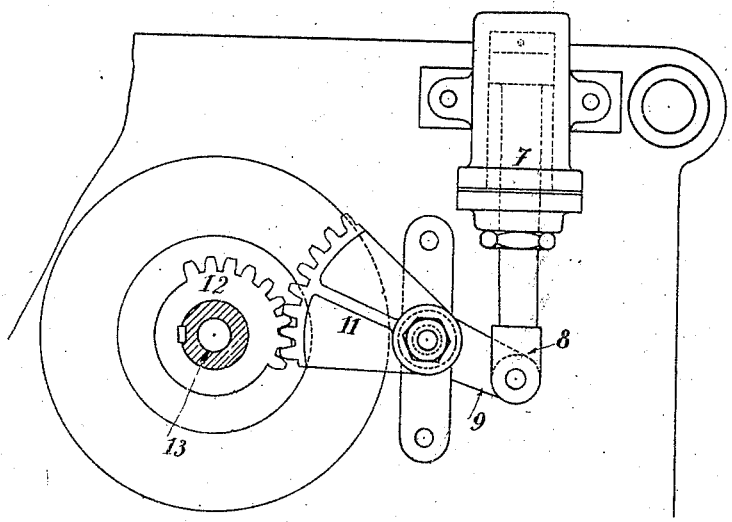
WITNESSES
INVENTOR
Amédée Étienne Vincent
ATTY.

UNITED STATES PATENT OFFICE.

AMÉDÉE ETIENNE VINCENT, OF NOISY-LE-SEC, FRANCE.

PRESS FOR VULCANIZING PNEUMATIC TIRES.

No. 868,732.  Specification of Letters Patent.  Patented Oct. 22, 1907.

Application filed June 12, 1907. Serial No. 378,563.

*To all whom it may concern:*

Be it known that I, AMÉDÉE ETIENNE VINCENT, a citizen of France, residing at 8 Rue Chanzy, Noisy-le-Sec, Seine, France, have invented new and useful Improvements in Presses for Vulcanizing Pneumatic Tires, of which the following is a specification.

The object of this invention is to provide a press for vulcanizing pneumatic tires, whose essential feature is the hydraulic and resilient operation of the core or stretching plate on which the tire is applied in course of vulcanizing,—these operative means insuring on the one hand the ascending and descending motions of the core in order to properly inclose the tire between the core and two half-shells and on the other hand, the extending and contracting motions of such core.

The invention also comprises the whole machine resulting from the combination of these operative means with each other as well as their combination with the complementary means provided for the guiding and the displacing of the several segments of the extensible core and with the usual elements of vulcanizing presses.

In the accompanying drawing, Figure 1 is a sectional elevation of the whole invention. Fig. 2 is a view of the stretching plate and of the cam-operating means of its segments. Fig. 3 is a plan view of the hydraulic operating means providing the extension and contraction motions of such core. Fig. 4 is a detail section of the extension core, drawn through line A A of Fig. 2.

The vulcanizing mold consists of two hollow half-shells $a$ and $b$ of appropriate shape, between which is inclosed, at will, by part of its profile, the extensible or non extensible core N of appropriate shape. The upper half shell $a$ is secured to the heated plate of the upper head of the vulcanizing press; the lower half-shell $b$ is similarly secured to the heated plate which is one with the movable platen $d$ of the press; this movable platen $d$ may be operated by hand or hydraulic power by well-known means; the drawing shows for this platen hydraulic operative means. As for the core N, its reciprocating motion is obtained by the hydraulic and resilient operative means described hereafter.

The supporting plate 1, which bears the whole extensible system, is mounted on the rods 2 of several hydraulic jacks 3 whose cylinders are bolted to the lower base of the press; the rods 2 pass through the movable platen of the press and are each encircled at their upper end by a coiled spring 5 bearing on the one hand on the supporting plate 1 and on the other on the movable platen of the press, which is supposed to be actuated by independent hydraulic operative means.

When the extensive core is covered with the tire $p$ to be vulcanized, the lower half-shell of the mold is actuated by sending water under pressure into the main cylinder $f$ of the press. The ascending motion of the movable platen of the press thus caused would result by bringing the lower half-shell $b$ rapidly to press directly on the extensible core, in deforming, in deranging or in deteriorating such core, as this is not yet supported on its upper face, but the insertion of springs 5 counteracts this premature and undesirable pressure. The first result of the ascending motion of the platen of the press is then to force down the springs 5 until the expansive action of such springs finally lifts the supporting plate 1 with all the extensible system which, from that moment only, takes part in the ascending motion. All these members thus ascend together until the moment when the upper part of the extensible core presses against the half-shell $a$ secured to the heated plate of the upper head. The ascending movement of the core is then arrested, but that of the under half-shell continues until the inclosing of this part and its pressing against the core are completed. The springs 5 are then firmly forced down while the usual vulcanizing is being effected. After this operation the main cylinder of the press is emptied, water being sent at the same time under pressure to the cylinders 4 of the hydraulic jacks. The lower half-shell begins its descending motion, but is not immediately followed by the core, for the springs 5, strongly compressed at that moment, first begin to relax by insuring the separating of the core from the lower half-shell and by maintaining such core in contact with the upper half-shell. As the descending motion continues, the springs 5 complete their progressive relaxing and the core, drawn by the pistons of the jacks, separates itself in turn from the upper half-shell, but without the springs allowing it to come again into contact with the lower half-shell which descends to its rest. Returned to this balanced position, the extensible core is now supported on its jacks between the two half-shells and is ready for the operation of contraction. The alternative motion of extension and contraction of the core is also effected by means of independent hydraulic operating means, employing the devices hereinafter described.

Another hydraulic jack 7 has its cylinder screwed to the lower bed of the vulcanizing press; the piston rod, which ends in a hood 8, draws with it a lever 9 which effects through a sliding-key-device, the reciprocating rotation of the shaft 10. At the upper end of this shaft is keyed a toothed sector 11 which gears with another toothed sector which moves with a sleeve 12. The reciprocating rotating motion of this sleeve is communicated by a sliding-key device to the hollow shaft which constitutes the central portion of the spiral-grooved plate 13 or cam plate. This plate, obeying freely to the reciprocating angular motion, is slidably mounted between the supporting plate 1 and the cylindrical casing 14 on which radially slide all the sections of the extensible core. In each of the spiral grooves 19 of the plate 13 is located a roller 15, mounted at the end of stud shaft 16, while the other end of such stud shaft passes through one of the motor segments 17 of the extensible core, to conduct it in all its movements. Each of the axis 16 pass freely through the cylindrical casing 14, going through a radial elongated aperture formed in such casing. It will thus be understood that when the spiral-grooved plate or cam plate rotates on its axis, each of its grooves, forming a true double-action cam, will conduct the roller 15 and the axis 16, drawing it to or from the axis, and this reciprocating movement can only be rectilinear and in the line of the radius, as the same axis 16 is guided in a higher plane by the radial apertures 18 of the cylindrical casing 14. The reciprocating rotating movement communicated to the spiral-grooved plate is thus transformed into a reciprocating rectilinear movement, directed radially and this movement, transmitted by the axis 16, draws the motor segments of the extensible core alternately to and from the center. On the other hand, to insure the coöperating mobility of the other complementary sectors of the extensible core, each motor-segment is inclosed between two complementary sectors by joints set obliquely to the axis of the motor segment as well as to that of the complementary sector. Each of these joints, instead of being formed simply by an inclined plane is constituted by a plurality of curved and plane surfaces, so that they render the motor segments and the complementary sectors partly secured to each other: as for instance a sliding attachment whose section might be either H-shape or ⊏-shape, or any other shape accomplishing the same object.

Having now described my invention what I claim as new and desire to secure by Letters Patent is:

1. A press for vulcanizing pneumatic tires comprising, an upper half-shell $a$ securely fixed in position, a lower half-shell $b$, the main cylinder $f$ of the press and its piston, a movable platen $d$ borne by the piston of the cylinder $f$ to which the lower half-shell $b$ is secured, a core N on which the pneumatic tire to be vulcanized is applied, hydraulic jacks 3 whose cylinders are securely fixed in position and which bear the core N, springs 5 which join the movable platen $d$ of the hydraulic press with the core N, substantially as described and for the purpose set forth.

2. A press for vulcanizing pneumatic tires comprising, a core N formed of segments, studs 16 coöperating with segments of the core N, a non rotatable cylindrical casing 14, elongated apertures 18 of said casing in which studs 16 slide radially, a rotating plate 13, spiral grooves 19 in said plate which holds studs 16, a toothed sector 12 which bears a sliding-key device, another toothed sector 11, a hydraulic jack 7, a hood 8 and a lever 9 with a sliding key-device, an upper half-shell $a$ securely fixed in position, a lower half-shell $b$, the main cylinder $f$ of the press and its piston, a movable platen $d$ borne by the piston of the cylinder $f$ to which the lower half-shell $b$ is secured, hydraulic jacks 3 whose cylinders are securely fixed in position and which bear the core N, springs 5 which join the movable platen $d$ of the hydraulic-press with the core N, substantially as described and for the purpose set forth.

In testimony whereof I have signed my name to this specification in the presence of two subscribing witnesses.

AMÉDÉE ETIENNE VINCENT.

Witnesses:
ANTOINE LAVOIX,
DEAN B. MASON.